US007389437B2

(12) United States Patent
Hashidate (10) Patent No.: US 7,389,437 B2
(45) Date of Patent: Jun. 17, 2008

(54) SEMICONDUCTOR CIRCUIT WITH MASK REGISTER

(75) Inventor: Shuichi Hashidate, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 435 days.

(21) Appl. No.: 11/133,200

(22) Filed: May 20, 2005

(65) Prior Publication Data

US 2006/0053314 A1    Mar. 9, 2006

(30) Foreign Application Priority Data

Sep. 6, 2004    (JP)    ............................. 2004-257955

(51) Int. Cl.
*G06F 1/00*    (2006.01)
(52) U.S. Cl. ........................ 713/323; 327/108; 327/143
(58) Field of Classification Search ................ 713/323; 327/108, 143
See application file for complete search history.

(56) References Cited

U.S. PATENT DOCUMENTS 6,411,564 B2 *   6/2002   Ikeda .......................... 365/233

6,734,706 B2 *   5/2004   Yoshida et al. ............. 327/108
6,894,545 B2 *   5/2005   Kodama ..................... 327/143
7,239,187 B2 *   7/2007   Ishikawa .................... 327/143

FOREIGN PATENT DOCUMENTS

JP    2002-223156    1/2001
JP    2002-312073    10/2002

* cited by examiner

*Primary Examiner*—Thomas Lee
*Assistant Examiner*—Vincent T Tran
(74) *Attorney, Agent, or Firm*—Studebaker & Brackett PC; Donald R. Studebaker (57) ABSTRACT

A semiconductor circuit includes an integrated circuit having a backup area that is constantly powered and a power-off area that is powered off in a standby mode. A register in the power-off area stores a mask signal that is normally set to the high level but is changed to the low level before a transition to the standby mode. A latch circuit in the backup area latches the low level but not the high level of the mask signal. A masking circuit in the backup area masks input signals from the power-off area to the backup area while the latch circuit is in the latched state. Besides preventing erratic input to the backup area during normal-to-standby transitions, this arrangement prevents leakage of current from the backup area to the power-off area on the mask signal line in the standby mode.

14 Claims, 4 Drawing Sheets

SEMICONDUCTOR CIRCUIT WITH MASK REGISTER

BACKGROUND OF THE INVENTION

1. Field of the Invention

The present invention relates to power supply control in a semiconductor circuit.

2. Description of the Related Art

As advances in semiconductor fabrication technology continue to reduce the sizes of transistors, the current that leaks through the transistors in the off-state continues to increase, causing large-scale integrated (LSI) circuits to draw significant amounts of current even in the standby state in which their input signals, output signals, and clock signals are all halted. This is a particularly serious problem for portable devices that operate on battery power; reducing the current consumption of these devices in the standby state has become a major issue. There are various ways to reduce the standby current consumed by an LSI circuit, the most effective of which is to use a switch to shut off its power supply.

Shutting off the power supply of an entire LSI circuit chip presents no particular problem: the same method can be used as is normally used to power the chip on and off. If the power supply of the entire LSI chip cannot be shut off, however, because the chip has an internal clock that must be kept running, for example, then the chip must be divided into two areas: a backup area that is always powered, and a power-off area that is powered on for normal operation and powered off in the standby state.

This requires special design of the circuitry in the boundary region between the backup area and the power-off area. More specifically, when the power supply to the power-off area is switched on or off, during the transient period before the power supply voltage stabilizes, the power-off area may send unintended signals to the backup area or draw unintended current from the backup area. The circuits in the boundary area must be designed to prevent this. A conventional method makes use of an externally generated masking signal.

Figure 1:
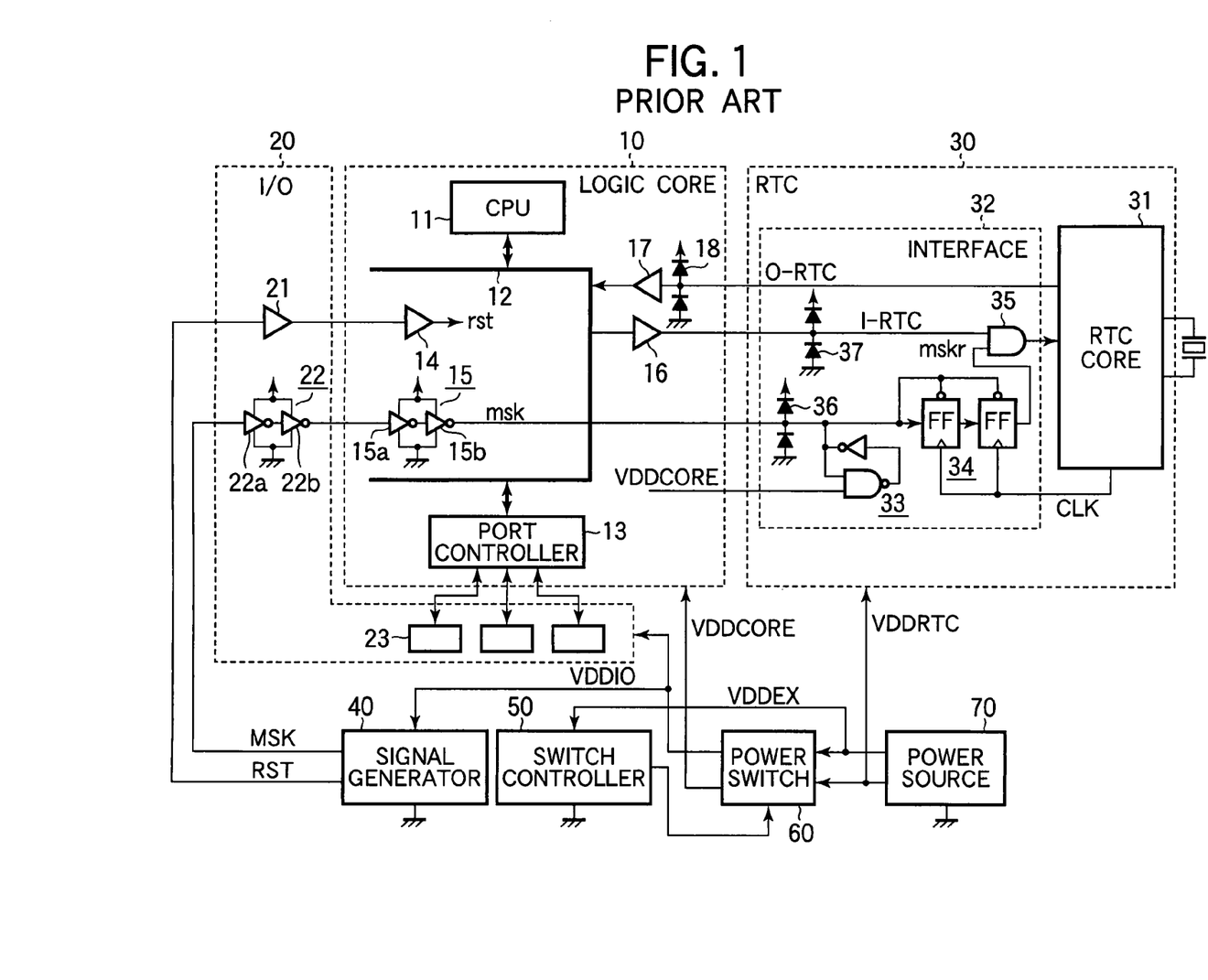
FIG. 1 is a block diagram schematically showing a conventional semiconductor circuit structure.

FIG. 1 shows an example of a semiconductor circuit using this conventional method. The semiconductor circuit comprises an LSI chip and external circuits. The LSI chip includes a logic core 10, an input-output (I/O) section 20, and a real-time clock counter or RTC 30. The external circuits include a signal generator 40, a switch controller 50, a power switch 60, and a power source 70.

The power source 70 supplies power at voltage levels of one and a half volts (1.5 V, VDDRTC) to the RTC 30 and 3.3 V (VDDEX) to the switch controller 50. Both levels are also supplied to the power switch 60, which supplies the 1.5-V level (VDDCORE) to the logic core 10 and the 3.3-V level (VDDIO) to the input-output section 20 and signal generator 40 during normal operation. In the standby state, these power supplies (VDDCORE, VDDIO) are switched off by a control signal from the switch controller 50.

The signal generator 40 generates a reset signal RST and a mask signal MSK.

The logic core 10 includes a central processing unit (CPU) 11 connected by a system bus 12 to a port controller 13 and memory (not shown), a pair of buffers 14 and 15 that receive signals from the input-output section 20 and convert their high logic levels from 3.3 V to 1.5 V, an output buffer 16 and an input buffer 17 through which the system bus 12 is connected to the RTC 30, and a pair of diodes 18 connected to the input terminal of the input buffer 17 for protection from electrostatic discharge (ESD).

The input-output section 20 transfers signals between the LSI chip and external circuits through buffers 21, 22 and ports 23. The buffers 21, 22 transfer the reset signal RST and mask signal MSK to buffers 14, 15 in the logic core 10. The ports 23 are controlled by the port controller 13 for general-purpose use.

The RTC 30 includes an RTC core 31 and an interface 32. The RTC core 31 is connected to an external crystal resonator with which it generates a real-time clock signal CLK having a frequency of substantially thirty-two kilohertz (32 KHz). The RTC core 31 uses this clock signal to count time and stores time information in internal registers (not shown).

The interface 32 receives the level-converted mask signal (msk) from buffer 15 in the logic core 10. A latch 33 comprising an inverter and a NAND gate connected in a loop latches the mask signal, the NAND gate receiving the mask signal and the VDDCORE power supply voltage from the logic core 10 as its two inputs. The latched mask signal is supplied to a synchronizing circuit 34 including a pair of flip-flops (FFs) clocked by the clock signal CLK. The synchronizing circuit 34 removes spike noise from the mask signal, and outputs a synchronous mask signal (mskr) to an AND gate 35. The AND gate 35 is both a buffer and a masking circuit for an input signal I-RTC received from buffer 16 in the logic core 10. The output of AND gate 35 is furnished to the RTC core 31, which returns an output signal O-RTC to the logic core 10. The interface 32 also includes protective diodes 36, 37 through which the I-RTC and O-RTC signal lines are connected to the VDDRTC power supply and ground.

The procedure for powering this semiconductor circuit up can be divided into four steps as follows.

(1) Under control of the switch controller 50, the power switch 60 begins output of the VDDIO and VDDCORE power supplies. The reset signal RST and mask signal MSK remain at the ground level, which is their active level (active low).

(2) After the VDDIO power supply stabilizes, the signal generator 40 inactivates the reset and mask signals by driving them high, and the CPU 11 starts operating. The mask signal (msk) output from the logic core 10 to the RTC 30 goes high.

(3) After a synchronizing delay in the synchronizing circuit 34, the synchronous mask signal (mskr) goes high and the AND gate 35 stops masking input to the RTC core 31.

(4) When necessary, the CPU 11 accesses the RTC core 31 to make settings or obtain time information.

The procedure for powering this semiconductor circuit off can be divided into three steps as follows.

(1) The signal generator 40 drives both the reset signal RST and the mask signal MSK low.

(2) After a propagation delay in the synchronizing circuit 34, the AND gate 35 begins masking input to the RTC core 31.

(3) Under control of the switch controller 50, the power switch 60 halts output of the VDDIO and VDDCORE power supplies. Supply of VDDRTC and VDDEX continues. The fall of VDDCORE locks the latch 33 in the low output state.

Further information can be found in Japanese Patent Application Publications No. 2002-223156 and No. 2002-312073.

The following problems (A) to (E), however, have been observed in the semiconductor circuit described above.

(A) The buffer 22 for the mask signal MSK in the input-output section 20 generally includes a cascaded pair of inverters 22a and 22b, as shown in FIG. 1. The corresponding buffer 15 in the logic core 10 also includes a cascaded pair of inverters 15a and 15b.

Before power-up, the VDDIO and VDDCORE power supply voltages are both at the ground potential and all of the inputs and outputs of these inverters 22a, 22b, 15a, 15b are low. During power-up, as the power supply levels stabilize over time, the outputs of inverters 15a and 22a should go high while the outputs of inverters 15b and 22b remain low. Since the VDDIO power supply voltage is supplied to the signal generator 40 as well as to the input-output section 20, however, VDDIO rises comparatively slowly. During the transient period before the power supply levels stabilize, due to propagation delay in inverter 22a, for example, there may be a brief interval in which the output level of inverter 22a is low and the output level of inverter 22b goes high, bringing the output level of inverter 15a back to the low level so that inverter 15b drives the mask signal (msk) to the high level. Depending on the timing relation of this interval to the clock signal CLK, the synchronous mask signal (mskr) may go high, allowing the I-RTC signal to propagate through the AND gate 35. The RTC core 31 then receives unpredictable input from the logic core 10 and may malfunction.

(B) When the mask signal MSK is driven low before a power shutoff, the output levels of inverters 22a and 15a go high, and the output levels of inverters 22b and 15b go low, driving the mask signal msk supplied to the RTC 30 low. Next, when power is shut off, the VDDIO and VDDCORE power supply voltages drop to the ground voltage over time, and all of the inputs and outputs of the inverters 22a, 22b, 15a, 15b likewise drop to the low logic level.

Due to capacitance differences, however, the high-to-low transitions of the power supplies and the high-to-low transitions of the signals output by different components of the signal generator 40 do not all take place simultaneously. During the transient period until VDDIO and VDDCORE stabilize at the ground level, there may be a brief period in which the output level of inverter 22a is low, the output level of inverter 22b is high, and the output level of inverter 15a is low, driving the mask signals (msk and mskr) high and allowing unpredictable input signals to reach the RTC core 31, which may then malfunction as in problem (A).

(C) Even if the RTC core 31 does not malfunction, if the mask signal (msk) goes high while the VDDCORE power supply voltage is still above the switching threshold of the NAND gate in the latch 33, the latch 33 may begin to supply the VDDRTC power supply voltage to the logic core 10 through buffer 15. The VDDRTC potential may then return from the logic core to the NAND gate on the VDDCORE signal line, causing the latch 33 to remain in the high output state even after VDDCORE has fallen to the ground potential. The logic core 10 then fails to power down completely and continues to draw leakage current through buffer 15 in the standby state. Moreover, the I-RTC signal line is left unmasked, so the RTC core 31 will be exposed to further unpredictable input the next time the logic core 10 is powered up.

(D) Although the low-to-high transition of the synchronous mask signal (mskr) is synchronized with the RTC clock signal CLK, this clock signal CLK is not synchronized with the bus clock (not shown) by which the CPU 11 accesses the RTC 30, so the CPU 11 cannot tell exactly when the internal mask in the RTC 30 has been cleared. When power is switched on, the CPU 11 may attempt to write data in these registers before the mask is cleared and then operate on the assumption that the data have been duly written, when in fact the data have been blocked by AND gate 35. Furthermore, if the latch 33 or synchronizing circuit 34 fails to respond promptly to the high-to-low transition of the mask signal (msk), power may be shut off while the I-RTC signal is still unmasked, allowing unpredictable input to reach the RTC core 31.

(E) When VDDCORE power is shut off, the O-RTC signal output from the backup area has to be driven low. This is inconvenient, but if power is shut off while O-RTC is high, the protective diode 18 on the VDDCORE side of the O-RTC signal line becomes forward biased and conducts current from the backup area into the logic core 10. The logic core 10 then fails to power down completely and continues to draw leakage current in the standby state.

This problem cannot be solved by moving the O-RTC protective diodes 18 into the backup area, because the protective diodes must be placed near the input of the buffer 17 they protect.

SUMMARY OF THE INVENTION

An object of the present invention is to provide a semiconductor circuit that can reliably enter a state in which its power is partly shut off.

The invented semiconductor circuit includes an integrated circuit and a switch, and operates in a normal mode and a standby mode. In the normal mode, power is supplied to the entire integrated circuit. In the standby mode, the switch shuts off the power supply to a power-off area in the integrated circuit, while a backup area in the integrated circuit continues to receive power. The power-off area includes a register storing a mask signal that is set to the high level in the normal mode and changed to the low level before a transition to the standby mode. The backup area includes a latch circuit that latches the low level but not the high level of the mask signal, and a masking circuit that masks input signals from the power-off area to the backup area by holding the input signals at the low level while the latch circuit is in the latched state.

The mask register is preferably set from within the integrated circuit, so that the mask signal is not affected by the behavior of an external signal generator during the transient period while power is being shut off, and unpredictable input signals during this period are reliably masked. Moreover, even if the output of the mask register goes temporarily high during the transient period, the latch circuit does not latch the high level. The standby mode can therefore be reliably entered and maintained, and current drain from the backup area to the power-off area through the mask signal line in the standby mode can be reliably prevented. For enhanced reliability, the masking circuit may also mask signals output from the backup area to the power-off area in the standby mode, and the backup area may include a state testing register that can be read from the power-off area to confirm that the mask has been set before the transition to the standby mode is permitted to take place.

DETAILED DESCRIPTION OF THE INVENTION

Embodiments of the invention will now be described with reference to the attached drawings, in which like elements are indicated by like reference characters.

First Embodiment

Figure 2:
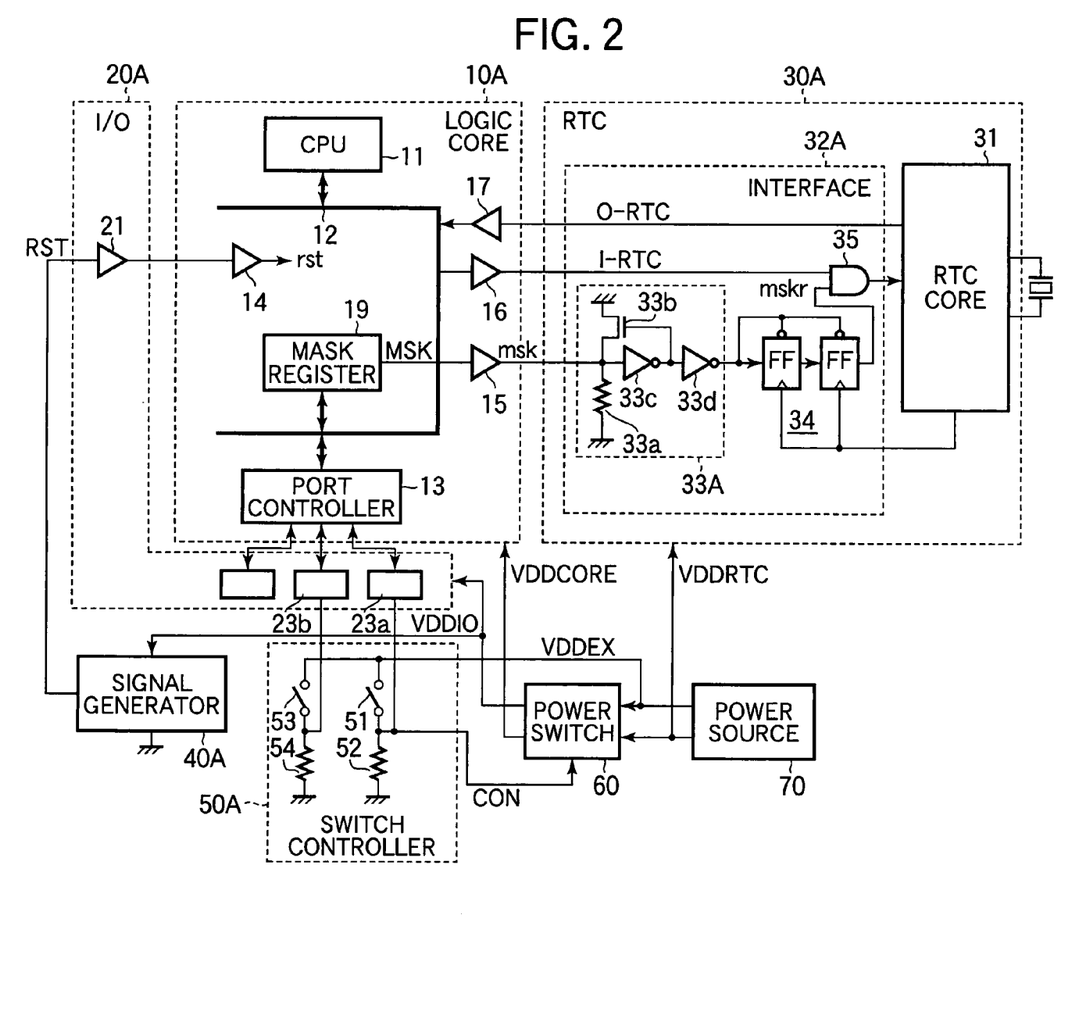
FIG. 2 is a block diagram schematically showing the structure of a semiconductor circuit according to a first embodiment of the invention.

Referring to FIG. 2, the first embodiment is a semiconductor circuit comprising a large-scale integrated circuit, referred to below as an LSI chip, and external circuits connected to the LSI chip. The LSI chip includes a logic core 10A, an input-output section 20A, and a real-time clock counter or RTC 30A. The external circuits include a signal generator 40A, a switch controller 50A, a power switch 60, and a battery power source 70. The semiconductor circuit operates in a normal mode and a standby mode, referred to below as a battery backup mode.

The logic core 10A and input-output section 20A are disposed in a power-off area that receives power in the normal mode but not in the battery backup mode. The power supply voltage VDDCORE of the logic core 10A is substantially 1.5 V; the power supply voltage VDDIO of the input-output section 20A is substantially 3.3 V.

Like the logic core 10 in FIG. 1, the logic core 10A has a CPU 11, a system bus 12 connected to a port controller 13 and memory (not shown), an input buffer 14 receiving a reset signal from the input-output section 20A, and an output buffer 16 and an input buffer 17 through which the system bus 12 is connected to the RTC 30A. Input buffer 14 converts the inactive (high) level of the reset signal from the VDDIO level to the VDDCORE level. When active (low), the resulting internal reset signal (rst) resets the logic core 10A to an initial state and halts the CPU 11.

The logic core 10A also has a one-bit mask register 19 accessed by the CPU 11 via the system bus 12. The bit stored in the mask register 19 is output as a mask signal MSK to a buffer 15, which outputs an identical mask signal (msk) to the RTC 30A. When the logic core 10A is reset, the mask signal MSK is initialized to the active level (low).

The input-output section 20A transfers signals between the LSI chip and external circuits. Besides a buffer 21 for the reset signal (RST), the input-output section 20A has a plurality of ports 23a, 23b, . . . controlled by the port controller 13 in the logic core 10A.

The RTC 30A is disposed in a backup area and receives a power supply voltage VDDRTC substantially equal to 1.5 V in both the normal mode and the battery backup mode. The RTC 30A includes an RTC core 31 and an interface 32A. The RTC core 31 has a clock oscillator circuit (not shown) connected to an external crystal resonator for generating a clock signal CLK with a frequency of substantially 32 KHz, and further circuitry (not shown) for generating time data from the clock signal and supplying the time data to the logic core 10A on an O-RTC signal line.

The interface 32A includes a latch circuit 33A that differs substantially from the latch circuit 33 in FIG. 1, and a synchronizing circuit 34 and AND gate 35 that are identical to the corresponding elements in FIG. 1.

The latch circuit 33A receives the mask signal (msk) output by buffer 15 in the logic core 10A, transmits both the high and low levels of the mask signal, latches the low level but not the high level, and holds the low output level when the buffer 15 is not powered. The latch circuit 33A includes a resistor 33a through which the latch input (msk) signal line is connected to ground, an n-channel transistor 33b through which the latch input signal line is also connected to ground, and a cascaded pair of inverters 33c and 33d. Inverter 33c inverts the input level and supplies the resulting inverted mask signal to inverter 33d and the gate of transistor 33b. Inverter 33d re-inverts the mask signal so that the input and output of the latch 33A are substantially identical.

The output signal from the latch circuit 33A is supplied to the synchronizing circuit 34, which comprises a cascaded pair of flip-flops (FFs) clocked by the RTC clock signal CLK, the first flip-flop receiving the latch output as its data input signal, both flip-flops receiving the latch output as a reset input signal. From the latch output signal, these flip-flops generate a synchronous mask signal (mskr) substantially free of spike noise that may be present in the latch output. The low-to-high transition of the synchronous mask signal is synchronized to the RTC clock signal CLK.

The synchronous mask signal (mskr) is supplied to the AND gate 35 that acts as a masking circuit and buffer for an input signal I-RTC received from the output buffer 16 in the logic core 10. The output of the AND gate 35 is supplied to the RTC core 31.

Although only one output buffer 16, one input signal line I-RTC, and one AND gate 35 are shown, there may be a plurality of these elements, enabling the RTC core 31 to receive parallel data and control signals from the logic core 10A. Similarly, there may be a plurality of output signal lines O-RTC.

The signal generator 40A generates the reset signal RST that is supplied to the logic core 10A via buffer 21 in the input-output section 20A. The signal generator 40A operates on the VDDIO power supply.

The switch controller 50A includes a parallel pair of series circuits: a power-up series circuit comprising a pushbutton switch 51 and resistor 52 by which a power supply voltage VDDEX substantially equal to 3.3 V output from the power source 70 is connected to ground, and a power shutoff series circuit comprising a similar pushbutton switch 53 and resistor 54. A node between pushbutton switch 51 and resistor 52 is connected to port 23a in the input-output section 20A. The voltage at this node is output as a control signal CON to the power switch 60. A node between pushbutton switch 53 and resistor 54 is connected to port 23b in the input-output section 20A. Pushbutton switches 51 and 53 are linked so that they cannot be closed simultaneously; the linking mechanism has been omitted so as not to obscure the invention with irrelevant detail.

The power switch 60 receives the VDDRTC and VDDEX power supplies from the power source 70, and outputs them as the VDDCORE and VDDIO power supplies when the control signal CON supplied from the switch controller 50A is high. The VDDRTC and VDDEX power supplies are always available, provided the power source 70 is functioning.

Next, the operation of the semiconductor circuit during power-up and power shutoff will be described.

(I) Operation During Power-Up (1) When pushbutton switch 51 is closed (turned on), the input to port 23a and the control signal CON, which have been pulled low by resistor 52, are driven high. The control signal CON goes high and the VDDIO and VDDCORE power supply voltages start to rise. The signal generator 40A holds the reset signal RST low, keeping the logic core 10A in the initial state, in which the mask signal (MSK) output by the mask register 19 is low. The mask signal (msk) output by buffer 15 and the signal output from the latch circuit 33A in the RTC 30A are also low.

(2) When the VDDIO and VDDCORE power supply voltages have stabilized at their respective levels of substantially 3.3 V and 1.5 V, the signal generator 40A drives the reset signal RST high, clearing the reset state, and the CPU 11 begins operating.

(3) After a certain period of time, the CPU 11 accesses the port controller 13, detects the high input level in port 23a, recognizes that pushbutton switch 51 is closed, and sets the port controller 13 to switch port 23a to the output mode and output a signal at the high level. Accordingly, even if pushbutton switch 51 is later opened (turned off), the control signal CON remains high, and the power switch 60 remains turned on. (If the CPU 11 detects a low input level when it accesses port 23a, indicating that pushbutton switch 51 has been released, it commences the power shutoff operation.)

(4) The CPU 11 accesses the mask register 19, and sets the mask signal MSK to the high level (the unmasked state). The mask signal (msk) supplied to the RTC 30A therefore goes high. The resistance of resistor 33a and the on-resistance of transistor 33b are high enough that the mask signal (msk) is not pulled down below the switching threshold of inverter 33c. Inverter 33c accordingly senses a high input and supplies a low output to the gate of transistor 33b and to inverter 33d. Transistor 33b turns off, and inverter 33d sends a high mask signal to the synchronizing circuit 34. After a synchronizing delay of from one to two cycles of the RTC clock signal CLK (up to substantially 1/16 millisecond), the synchronizing circuit 34A supplies a high synchronous mask signal (mskr) to the AND gate 35, enabling the RTC core 31 to receive the input signal I-RTC from the logic core 10A.

(II) Operation During Power Shutoff (1) When pushbutton switch 53 is closed (turned on), the input to port 23b, which has been pulled low by resistor 54, now goes high. The CPU 11 accesses the port controller 13 and checks the input level in port 23b periodically. If the input level in port 23b remains high for a predetermined length of time, the CPU 11 recognizes pushbutton switch 53 as being turned on and starts the power shutoff operation. If the low level is detected within the predetermined length of time from the detection of the high level in port 23b, power is not shut off and normal operation continues.

(2) The CPU 11 accesses the mask register 19 and sets the mask signal MSK to the low level (the masked state). The mask signal (msk) supplied to the RTC 30A therefore goes low. In the latch circuit 33A, the output signal from inverter 33c goes high, turning on transistor 33b, thereby connecting the input of inverter 33c to ground and latching the mask signal (msk) at the low level. Inverter 33d inverts the high output level of inverter 33c and supplies a low signal to the synchronizing circuit 34, which is reset and sends a low synchronous mask signal (mskr) to AND gate 35 forthwith. The input signal I-RTC from the logic core 10A is thereby masked, and does not reach the RTC core 31.

(3) The CPU 11 waits long enough to allow the RTC 30A to mask the input signal I-RTC as described above, then accesses the port controller 13 and sets port 23a to the low output level. Since pushbutton switch 51 is open, the control signal CON goes low and the power switch 60 is turned off, shutting off the VDDIO and VDDCORE power supply voltages. Since this also shuts off the power supply of the signal generator 40A, the reset signal RST goes low. The VDDRTC power supply voltage continues to be supplied to the RTC 30A, and the latch circuit 33A continues to hold the low output level.

The mask signal (msk) may go high briefly during the unstable period while power is being shut off, but the latch circuit 33A does not latch these transient highs. Moreover, there is no output path from the latch circuit 33A to buffer 15, so no current can flow from the RTC 30A to the logic core 10A on the mask signal line.

As described above, the logic core 10A in the first embodiment includes a CPU-controllable mask register 19 that outputs the mask signal MSK. Accordingly, the mask signal MSK is not affected by the behavior of the signal generator 40 when power is switched on and off, differing in this way from the mask signal in the conventional semiconductor circuit in FIG. 1. Since the latch circuit 33A in the RTC 30A has no output terminal connected to the mask signal line from buffer 15 in the logic core 10A, even if the mask signal goes high briefly during the unstable period while power is being shut off, this transient high does not lead to any flow of current into buffer 15, and does not prevent the logic core 10A from powering down completely. It is also impossible for the latch circuit 33A to be left in the high output state after the logic core 10A is powered off; once the VDDCORE power supply voltage has fallen to the ground level, resistor 33a ensures that the output of the latch circuit 33A will also go low. The input signal I-RTC will therefore still be masked the next time the logic core 10A is powered up.

Another effect of the first embodiment is that since the mask signal MSK is generated inside the logic core 10A, the signal generator 40 can be simplified and an external terminal of the LSI chip is freed for other use.

The first embodiment can be modified in various ways within the scope of the invention. For example:
(a) The switch controller 50A need not be operated by pushbutton switches 51, 53 as shown for simplicity in FIG. 2. The switch controller 50A may be adapted to detect various states and control its own switches or notify the CPU 11 accordingly.
(b) The CPU 11 may shut power off on its own initiative.
(c) The synchronizing circuit 34 in the RTC 30A may be omitted.
(d) The second inverter 33d in the latch circuit 33A may be omitted, provided the AND gate 35 is replaced by a NOR gate and the output buffer 16 is replaced by an inverter.

Second Embodiment

Figure 3:
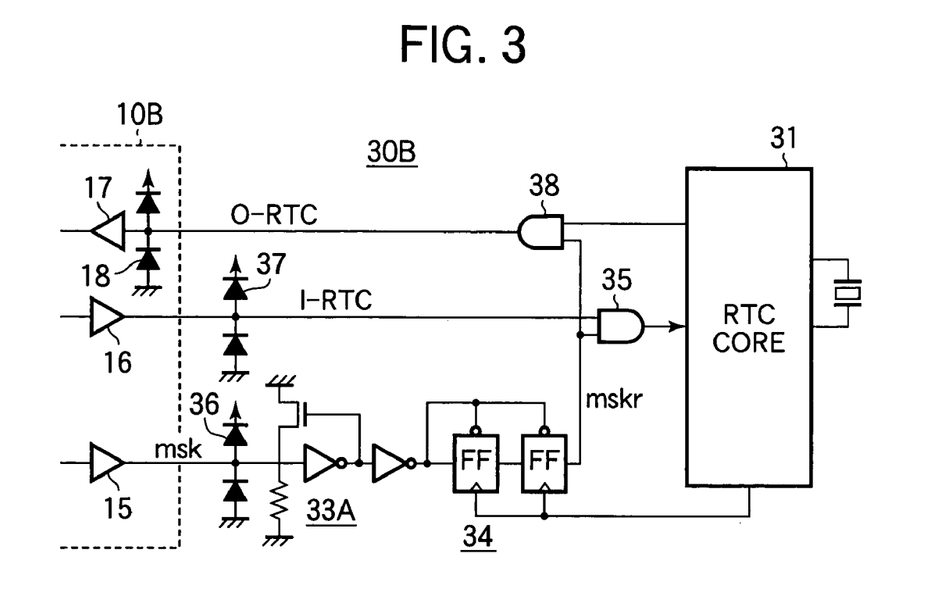
FIG. 3 is a circuit diagram of an RTC according to a second embodiment of the invention.

FIG. 3 shows the RTC and its associated circuits in a second embodiment of the invention. The second embodiment differs from the first embodiment by replacing the logic core 10A and RTC 30A in the first embodiment in FIG. 2 with a modified logic core 10B and RTC 30B. The logic core 10B is modified by the addition of protective diodes 18 for the O-RTC signal line. The RTC 30B is modified by the addition of protective diodes 36, 37 for the mask (msk) and I-RTC signal lines, and an AND gate 38 that masks the O-RTC output signal when the synchronous mask signal (mskr) is low.

If there are multiple O-RTC signals, the second embodiment provides a separate AND gate 38 for each O-RTC signal line, each AND gate 38 receiving the synchronous mask signal (mskr) from the synchronizing circuit 34.

When the power of the power-off area is switched on, the logic core 10B and RTC 30B operate as described in the first embodiment, keeping the mask signals (MSK, msk, mskr) in the active state (low) until the power supply voltages have stabilized and the CPU is running. While the mask signals are active, both the input signal I-RTC to the RTC core 31 and the output signal O-RTC from the RTC core 31 are held at the low level.

The logic core 10B and RTC 30B also operate as described in the first embodiment when the power of the power-off area is shut off. Before switching port 23a (FIG. 2) to the low output level, the CPU 11 accesses the mask register 19 and activates the mask signal MSK. Both the input signal I-RTC and the output signal O-RTC are brought low before the VDDCORE power supply voltage is switched off, and held low as VDDCORE falls to the ground level.

In addition to the effects of the first embodiment, the second embodiment has the effect that the protective diode 18 connecting the O-RTC signal line to the VDDCORE power supply cannot become forward biased during power shutoff, because the O-RTC signal is held in the low output state. Accordingly, no current can flow into the logic core 10B on the O-RTC power line to prevent the logic core 10 from being completely powered off. Further benefits are that the O-RTC signal line is held low without the need to alter the output of the RTC core 31 itself, and remains low even if the RTC core 31 malfunctions.

Third Embodiment

Figure 4:
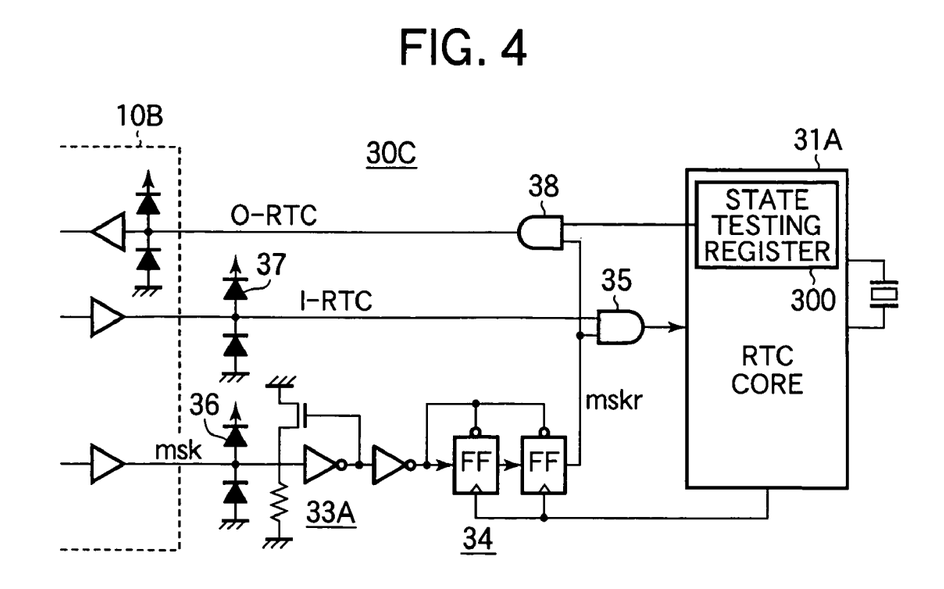
FIG. 4 is a circuit diagram of an RTC according to a third embodiment of the invention.

FIG. 4 shows the RTC and associated circuits in a third embodiment of the invention. The third embodiment differs from the second embodiment by replacing the RTC 30B in FIG. 3 with a modified RTC 30C in which the RTC core 31A has an additional state testing register 300. The state testing register 300 stores arbitrary data that can be read and written from the logic core 10B when the logic core 10B is powered and the mask is cleared. The RTC core 31A also includes a clock oscillator and further circuitry for generating time data as noted in the first embodiment.

The state testing register 300 is used as follows.

During power-up, after accessing the mask register and clearing the mask signal MSK as described in the first embodiment, the CPU in the logic core 10B writes a value other than zero in the state testing register 300, then reads the data in the state testing register 300. If the mask in the RTC 30C has been cleared (the synchronous mask signal mskr has gone high) the CPU will read the value it wrote, thereby confirming the clearing of the mask, and can proceed to access other registers (not shown) in the RTC core 31A. If the mask has not been cleared (mskr still low) the CPU reads a value of zero, because the output of AND gate 38 is low. The CPU then repeats the write-read test of the state testing register 300 until it reads the value it wrote.

During power shutoff, after accessing the mask register and activating the mask signal MSK, the CPU writes a non-zero value in the state testing register 300, then reads the state testing register 300. If the value read is zero, indicating that the mask has been set, the CPU proceeds to switch power off as described in the first embodiment. If the value read is not zero, the CPU repeats the write-read test until a zero result is obtained, and then shuts power off.

By enabling the CPU to confirm that the mask has been cleared before accessing the time data RTC core 31A, and that the mask has been set before switching power off, the state testing register 300 enables these operations to be made more reliable. A further benefit is that the CPU can determine that the mask has been set or cleared almost as soon as the setting or clearing takes place, and then proceed immediately with RTC register access or power shutoff, instead of having to allow for the maximum delay that might occur in the synchronizing circuit 34. The third embodiment accordingly provides the benefits of the first and second embodiments, with the additional benefits of higher reliability and quicker start-up and shutdown.

In a variation of the third embodiment, at power-off the CPU writes the non-zero value in the state testing register 300 before activating the mask signal.

In another variation of the third embodiment, the state testing register 300 is a read-only register storing a predetermined non-zero value. The CPU then does not have to write data to decide whether the mask is set or cleared; it only has to read the state testing register 300 and decide whether the result is zero or the predetermined value.

Fourth Embodiment

Figure 5:
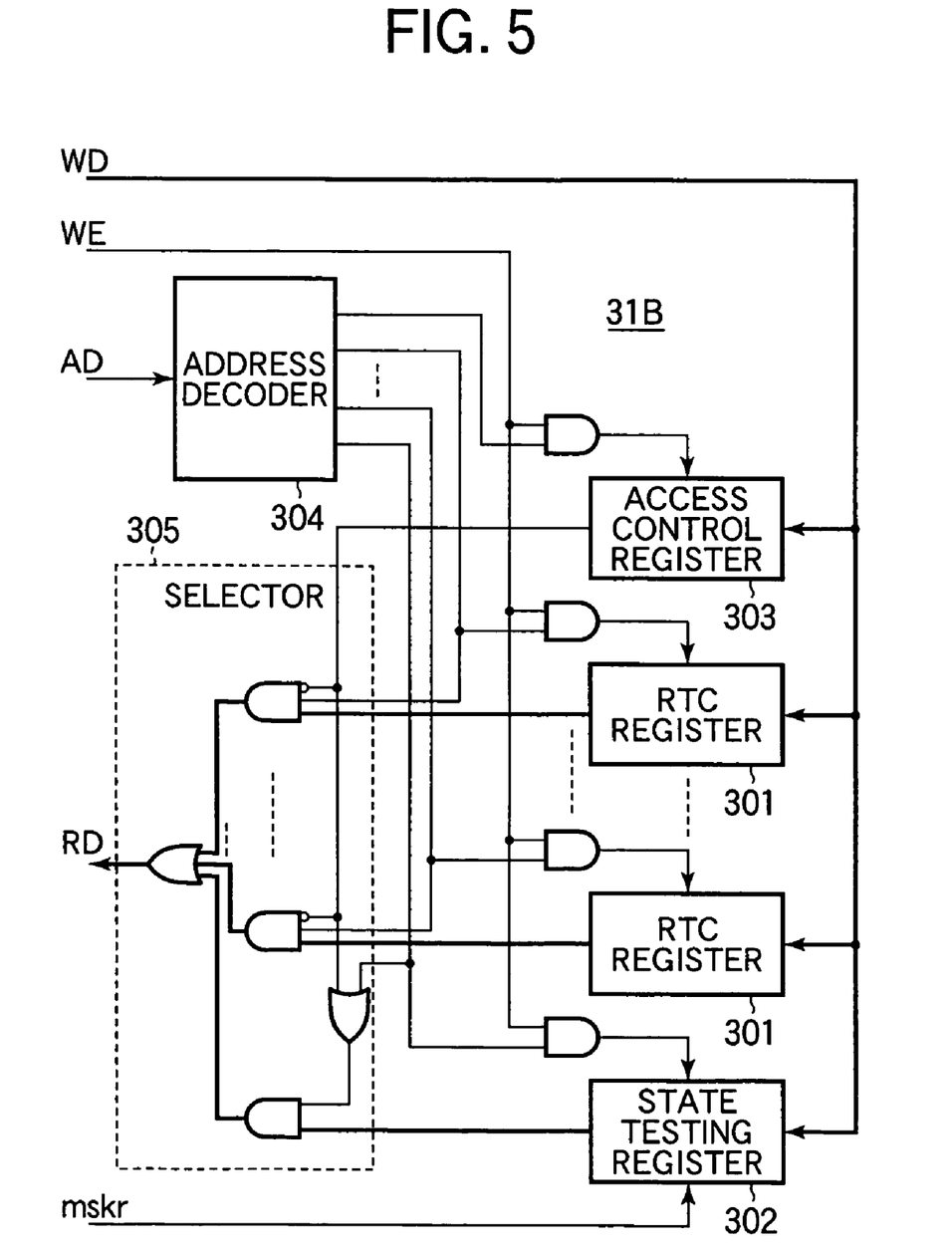
FIG. 5 is a circuit diagram of an RTC core according to a fourth embodiment of the invention.

FIG. 5 shows the RTC core in a fourth embodiment of the invention. The fourth embodiment differs from the second embodiment by replacing the RTC core 31 in FIG. 3 with an RTC core 31B having a plurality of RTC registers 301, a state testing register 302, and an access control register 303. The data input terminals of these registers 301, 302, 303 are connected to a write data bus that receives write data WD from the logic core 10B.

The RTC registers 301 store time data. The RTC core 31B also has circuitry (not shown) for generating the time data from a substantially 32-KHz clock signal.

Like the state testing register 300 in the third embodiment, the state testing register 302 stores arbitrary data that can be read and written from the logic core 10B, but the state testing register 302 also has a reset input terminal and is reset to zero by a high-to-low transition of the synchronous mask signal (mskr).

The access control register 303 outputs a signal that, when low, enables output from a register (the state testing register 302 or one of the RTC registers 301) selected by a decoded address signal, and when high disables output from the RTC registers 301 and enables output from the state testing register 302 regardless of the address signal.

The RTC core 31B also has an address decoder 304 that decodes an address signal AD received from the logic core 10B and outputs a plurality of selection signals (decoded address signals) to a selector 305. The selection signals output from the address decoder 304 are also ANDed with a write enable signal WE from the logic core 10B, and the ANDed results are supplied to the write control terminals of the RTC registers 301, state testing register 302, and access control register 303.

The selector 305 selects the data output from the state testing register 302 or one of the RTC registers 301 according to the signals output from the access control register 303 and address decoder 304, and supplies the selected output data as read data RD to a read data bus. When the access control register 303 is set to the high level, the selector 305 outputs the data in the state testing register 302 as read data RD regardless of the address signal AD.

The write data (WD), write enable (WE), and address (AD) signal lines are input signal lines similar to I-RTC in FIG. 3, with respective AND gates 35. The read data (RD) signal lines are output signal lines similar to O-RTC in FIG. 3, with respective AND gates 38.

Next, the operation of the fourth embodiment will be described.

At power-up, the CPU (FIG. 2) operates as described in the preceding embodiments. More specifically, after accessing the mask register and clearing the mask signal MSK, the CPU writes a non-zero value in the state testing register 302 in FIG. 5, immediately reads the state testing register 302, and repeats this write-read operation until it reads a value identical to the written value, indicating that the masking of signals input to and output from the RTC core 31B has ceased. The CPU then writes data in the access control register 303 to set the output of the access control register 303 to the low level and enable read access to the RTC registers 301.

At power-off, the CPU first writes to the access control register 303, setting the output of the access control register 303 to the high level. Accordingly, regardless of the address signal AD, the selector 305 selects the data in the state testing register 302 for output as the read data RD.

Next, the CPU accesses the mask register (FIG. 2) and activates the mask signal MSK. The CPU then writes a non-zero value in the state testing register 302, immediately reads the state testing register 302, and repeats this write-read operation until the value read is zero, confirming that the synchronous mask signal (mskr) has gone low and the mask is actually set. After obtaining this confirmation, the CPU proceeds to switch power off as described in the first embodiment.

Since the state testing register 302 is reset to zero when the synchronous mask signal (mskr) goes low, and since the access control register 302 has been set to allow the selector 305 to select only the output of the state testing register 302, while the power supply of the logic core is being shut off and in the ensuing battery backup mode, the data output from the RTC core 31B are not only masked; they are zero (low) data to begin with. The fourth embodiment accordingly makes doubly certain that no high level signals are output from the RTC core 31B to the logic core while its power supply is being shut off. The possibility that a protective diode in the logic core will be forward biased by a transient high on an output signal line is therefore eliminated substantially completely, assuring a smooth transition to the power-off state even when there is noise on the mask signal line.

In a variation of the fourth embodiment, the AND gates on the output signal lines (the read data bus) are eliminated, the setting of the access control register 303 and the resetting of the state testing register 302 being relied on to assure that the output signals remain low when power is shut off.

Other variations of the preceding embodiments have been mentioned above, but those skilled in the art will recognize that still further variations are possible within the scope of the invention, which is defined in the appended claims.

What is claimed is:

1. A semiconductor circuit including an integrated circuit and a switch, the switch controlling the supply of power to the integrated circuit, the integrated circuit having a power-off area and a backup area, the semiconductor circuit operating in a normal mode in which power is supplied to both the power-off area and the backup area and a standby mode in which power is supplied to the backup area but not to the power-off area, wherein:

the power-off area includes a register storing a mask signal having a high level and a low level, the mask signal being set to the high level in the normal mode and changed to the low level before a transition to the standby mode; and the backup area includes a latch circuit and a masking circuit, the latch circuit receiving the mask signal from the power-off area, assuming a first output state when the mask signal is at the high level, assuming a second output state when the mask signal is at the low level, and remaining in the second output state when the power-off area is not powered, the masking circuit masking an input signal from the power-off area to the backup area by holding the input signal at the low level while the latch circuit is in the second output state, wherein the backup area receives a ground potential and the latch circuit comprises:

a first inverter having an input terminal receiving the mask signal from the power-off area, the first inverter generating an inverted mask signal; and a transistor through which the input terminal of the first inverter is connected to the ground potential, the transistor having a gate receiving the inverted mask signal from the first inverter.

2. The semiconductor circuit of claim 1, wherein the latch circuit further comprises a resistor through which the input terminal of the first inverter is connected to the ground potential.

3. The semiconductor circuit of claim 1, wherein the latch circuit further comprises a second inverter receiving the inverted mask signal from the first inverter and supplying a re-inverted mask signal to the masking circuit.

4. The semiconductor circuit of claim 1, wherein the masking circuit includes a synchronizing circuit generating a synchronous mask signal according to the output state of the latch circuit, transitions of the synchronous mask signal being synchronized to a clock signal.

5. The semiconductor circuit of claim 1, wherein the masking circuit includes a logic gate performing a logic operation on the mask signal and the input signal.

6. A semiconductor circuit including an integrated circuit and a switch, the switch controlling the supply of power to the integrated circuit, the integrated circuit having a power-off area and a backup area, the semiconductor circuit operating in a normal mode in which power is supplied to both the power-off area and the backup area and a standby mode in which power is supplied to the backup area but not to the power-off area, wherein:

the power-off area includes a register storing a mask signal having a high level and a low level, the mask signal being set to the high level in the normal mode and changed to the low level before a transition to the standby mode; and the backup area includes a latch circuit and a masking circuit, the latch circuit receiving the mask signal from the power-off area, assuming a first output state when the mask signal is at the high level, assuming a second output state when the mask signal is at the low level, and remaining in the second output state when the power-off area is not powered, the masking circuit masking an input signal from the power-off area to the backup area by holding the input signal at the low level while the latch circuit is in the second output state, wherein the masking circuit also holds an output signal sent from the backup area to the power-off area at the low level while the latch circuit is in the second output state, wherein the masking circuit includes a logic gate performing a logic operation on the mask signal and the output signal.

7. A semiconductor circuit including an integrated circuit and a switch, the switch controlling the supply of power to the integrated circuit, the integrated circuit having a power-off area and a backup area, the semiconductor circuit operating in a normal mode in which power is supplied to both the power-off area and the backup area and a standby mode in which power is supplied to the backup area but not to the power-off area, wherein:

the power-off area includes a register storing a mask signal having a high level and a low level, the mask signal being set to the high level in the normal mode and changed to the low level before a transition to the standby mode; and the backup area includes a latch circuit and a masking circuit, the latch circuit receiving the mask signal from the power-off area, assuming a first output state when the mask signal is at the high level, assuming a second output state when the mask signal is at the low level, and remaining in the second output state when the power-off area is not powered, the masking circuit masking an input signal from the power-off area to the backup area by holding the input signal at the low level while the latch circuit is in the second output state, wherein the backup area also includes a state testing register that can be read from the power-off area to obtain a first value when the input signal is masked and a second value, different from the first value, when the input signal is not masked.

8. The semiconductor circuit of claim 7, wherein the power-off area includes a processor that, preceding a transition from the normal mode to the standby mode, sets the mask signal to the low level, then reads the state testing register until the first value is obtained.

9. The semiconductor circuit of claim 8, wherein, following a transition from the standby mode to the normal mode, the processor sets the mask signal to the high level, then reads the state testing register until the second value is obtained.

10. The semiconductor circuit of claim 8, wherein the state testing register can also be written to from the power-off area.

11. The semiconductor circuit of claim 10, wherein before reading the state testing register, the processor writes the second value in the state testing register.

12. A semiconductor circuit including an integrated circuit and a switch, the switch controlling the supply of power to the integrated circuit, the integrated circuit having a power-off area and a backup area, the semiconductor circuit operating in a normal mode in which power is supplied to both the power-off area and the backup area and a standby mode in which power is supplied to the backup area but not to the power-off area, wherein:

the power-off area includes a register storing a mask signal having a high level and a low level, the mask signal being set to the high level in the normal mode and changed to the low level before a transition to the standby mode; and the backup area includes a latch circuit and a masking circuit, the latch circuit receiving the mask signal from the power-off area, assuming a first output state when the mask signal is at the high level, assuming a second output state when the mask signal is at the low level, and remaining in the second output state when the power-off area is not powered, the masking circuit masking an input signal from the power-off area to the backup area by holding the input signal at the low level while the latch circuit is in the second output state, wherein the backup area also includes:

a plurality of addressable registers having addresses that can be specified from the power-off area and storing data that are readable from the power-off area, one of the addressable registers being a state testing register storing data that can also be written to from the power-off area, the state testing register being reset to a first value when the latch circuit is in the second output state, the first value producing output at the low level when read from the power-off area;

an access control register settable to a first state and a second state from the power-off area; and a selector that selects the addressable registers according to their addresses when the access control register is in the first state, selects the state testing register when the access control register is in the second state, and supplies data from the selected addressable register to the power-off area.

13. The semiconductor circuit of claim 12, wherein the power-off area includes a processor that, preceding a transition from the normal mode to the standby mode, sets the access control register to the second state, then sets the mask signal to the low level, then reads the state testing register until the first value is obtained.

14. The semiconductor circuit of claim 13, wherein, following a transition from the standby mode to the normal mode, the processor sets the mask signal to the high level, then writes a second value different from the first value in the state testing register and reads the state testing register.

* * * * *